United States Patent [19]

Stewart

[11] Patent Number: 5,424,105
[45] Date of Patent: Jun. 13, 1995

[54] APPARATUS AND METHOD FOR EFFECTING REPAIR TO DAMAGED NON-STRESSED AIRCRAFT STRUCTURE

[76] Inventor: Michael D. Stewart, 944 Cimarron Ter., Escondido, Calif. 92029

[21] Appl. No.: 66,614

[22] Filed: May 19, 1993

Related U.S. Application Data

[63] Continuation of Ser. No. 569,551, Aug. 20, 1990, abandoned.

[51] Int. Cl.$^6$ ................................................ B32B 3/26
[52] U.S. Cl. ........................ 428/40; 244/119; 244/132; 428/63; 428/213; 428/214; 428/268; 428/273; 428/286; 428/290; 428/354; 428/355; 428/356; 428/421; 428/457; 428/920; 428/921
[58] Field of Search ................ 428/40, 63, 343, 268, 428/421, 354, 273, 285, 286, 290, 251, 355, 356, 920, 921, 213, 214, 457; 156/94, 98; 29/402.09, 402.11; 244/119, 132

[56] References Cited

U.S. PATENT DOCUMENTS

| | | | |
|---|---|---|---|
| 3,470,048 | 9/1969 | Jones | 156/94 |
| 3,850,718 | 11/1974 | Trapani | 156/94 |
| 4,147,576 | 4/1979 | Beem | 156/94 |
| 4,407,619 | 10/1983 | Siebol | 411/69 |
| 4,473,419 | 9/1984 | Hardy | 156/94 |
| 4,517,038 | 5/1985 | Miller | 428/63 |
| 4,661,182 | 4/1987 | Lerner | 428/63 |
| 4,707,391 | 11/1987 | Hoffman | 428/63 |
| 4,726,101 | 2/1988 | Draghi et al. | 29/402.09 |
| 4,732,633 | 3/1988 | Pokorny | 156/94 |
| 4,759,812 | 7/1988 | Miller | 156/98 |
| 4,824,500 | 4/1989 | White | 156/98 |
| 4,855,182 | 8/1989 | Ondrejas | 428/63 |
| 4,858,853 | 8/1989 | Westerman et al. | 294/119 |
| 4,978,404 | 12/1990 | Westerman | 428/63 |

Primary Examiner—Ellis P. Robinson
Assistant Examiner—Nasser Ahmad
Attorney, Agent, or Firm—Chris Papageorge; Howard A. Kenyon

[57] ABSTRACT

A apparatus and method for effecting repair to damaged, nonstressed aircraft structure is described. A sheet of material comprised of woven glass cloth impregnated with a resin cured under temperature and pressure forms the basic patch. One side of the patch has a Tedlar ® overlay attached to the sheet face in the preferred embodiment. This patch material meets the Federal Aviation Regulations (FAR 25.855) which is required to provide for fire resistant material on transport aircraft. A pressure sensitive film is bonded to the side opposite the Tedlar ® overlay. This combination of glass sheet and pressure sensitive film is pressure bonded to the damaged structure and further held in place by mechanical fasteners which can withstand a temperature of at least 1,700 degrees Fahrenheit.

One of the primary applications of this invention is in the cargo liner repair of transport aircraft. A fire in the cargo bay must be contained in that area and not allowed to spread to the aircraft due to a damaged cargo liner.

19 Claims, 1 Drawing Sheet

APPARATUS AND METHOD FOR EFFECTING REPAIR TO DAMAGED NON-STRESSED AIRCRAFT STRUCTURE

This is a continuation of application Ser. No. 07/569,551 filed on Aug. 20, 1990 now abandoned.

BACKGROUND OF THE INVENTION

1. Field of the Invention

This invention pertains to an apparatus and method for effecting repairs to damaged, nonstressed aircraft structure. More specifically, this invention provides a repair to damaged, nonstressed aircraft structure that will withstand a burn requirement established by the Federal Aviation Regulation (FAR 25.855).

2. Description of the Prior Art

There are damaged, non-stressed structures in specific parts of transport aircraft that must be repaired immediately to prevent loss of life and property in the event of a catastrophic situation such as a fire. One such structure is the cargo bay of a transport aircraft. Cargo bays contain a cargo bay liner that is made from high impact resistant and fire resistant material. These cargo liners take considerable abuse from the loading and off loading of cargo at every aircraft terminal. Invariably, in time, a sharp object of cargo will puncture a hole in the liner or damage the liner such that the liner integrity is in question. The FAA regulation effective March, 1991 states that as soon as the damage is discovered, a repair must be made prior to the next flight. This repair must provide the same burn resistance as the original liner had before the damage. The present invention provides this requirement and can be installed in less than 20 minutes, which can be accomplished, most of the time, between flights.

There are several repair devices and methods available for various types of damaged to aircraft structure. One such method is found in U.S. Pat. No. 4,517,038, which describes a method of repairing ballistic damage to stressed structure. This patent descries a sandwich material of metal, nylon and armid cloth which are heated and fused together to form a strong patch that may be bent to shape like the surface of an airfoil. The patch is then bonded and riveted in place.

Another repair apparatus is described in U.S. Pat. No. 4,858,853. This patent describes a stack of thin flexible metal plates with adhesive applied therebetween. The plates are bent to shape and bolted onto the outside of the aircraft structure. Obviously this is a field repair because a plate bolted on the outside of a wing would cause drag and flow disturbance.

U.S. Pat. No. 4,759,812 discloses a method and apparatus for effecting field repairs in stress carrying structures. This patent describes a patch using two thin metal sheets bent to shape with one part of VELCRO® bonded to each side. The metal sheets have a resin impregnating the VELCRO® and when the resin hardens, the patch becomes stiff.

U.S. Pat. No. 3,470,048 describes a method of patching metal car bodies using a metal patch bonded to the body with pressure sensitive film. No mechanical fasteners are used as in the present invention.

U.S. Pat. No. 4,707,391 describes a vehicle body surface repair assembly for automobiles and uses a perforated thin metal or plastic plate. This plate is placed over the damaged part and fiberglass mesh is placed over the plate. Fiberglass body surface repair compound such as Bondo ® is forced in the mesh and perforated plate to better support the repair.

U.S. Pat. No. 3,850,718 uses a metal patch with a thin layer of high density foam bonded to one side. A pressure sensitive adhesive is bonded to the foam which is then applied to the damaged area. This patch finds application in truck trailers and sea going cargo containers.

From the foregoing, the need should be appreciated for a repair patch that will meet the burn requirement of FAR 25.855. The present invention, which is fire resistant, will not loose its integrity even if the adhesive, which is fire retardant, does not hold the patch in place. The fasteners, which will withstand a temperature of at least 1,700 degrees Faherinheit will hold the patch in place and prevent the fire from reaching the aircraft structure. Accordingly, a fuller understanding of the invention may be obtained by refering to the summary of the invention, and the detailed description of the preferred embodiment, in addition to the scope of the invention defined by the claims taken in conjunction with the accompanying drawings.

SUMMARY OF THE INVENTION

It is the object of the present invention to provide an apparatus and method for effecting a repair to a damaged, non-stressed transport aircraft structure.

It is another object of this invention to provide an apparatus and method for effecting a repair to a damaged, non-stressed aircraft structure of a transport aircraft.

It is a further object of this invention to provide an apparatus and method for effecting a repair to a damaged, non-stressed transport aircraft structure that will meet the Federal Aviation Regulations (FAR 25.855).

It is yet another object of this invention to provide an apparatus and method for effecting a repair to a damaged, non-stressed transport aircraft structure that contains fire resistant mechanical blind fasteners.

Briefly, in accordance with this invention, there is provided a glass cloth material impregnated with a resin and cured under heat and pressure. A pressure sensitive film is bonded to one side of the cured glass cloth to form a patch. The patch is placed over the damaged area and pressure is applied to the patch to form an air tight seal. Mechanical fasteners of the blind type are placed around the edge of the patch and tightened to form a firm mate. In the preferred embodiment, the cured glass cloth has a Tedlar ® overlay bonded to one side. In addition, the pressure sensitive film is fire retardant and the blind fasteners can withstand a temperature of at least 1,700 degrees fahrenheit. The present invention is simple, reliable and inexpensive to manufacture. It is estimated that a repair can be made to a non-stressed transport aircraft structure in less than 20 minutes.

While the invention will be described in connection with the preferred embodiment, it will be understood that it is not intended to limit the invention to those embodiments. On the contrary, it is intended to cover all alternates, modifications and equivalents that may be included wihin the spirit and scope of the invention as described by the appended claims.

DESCRIPTION OF THE PREFERRED EMBODIMENT

Figure 1:
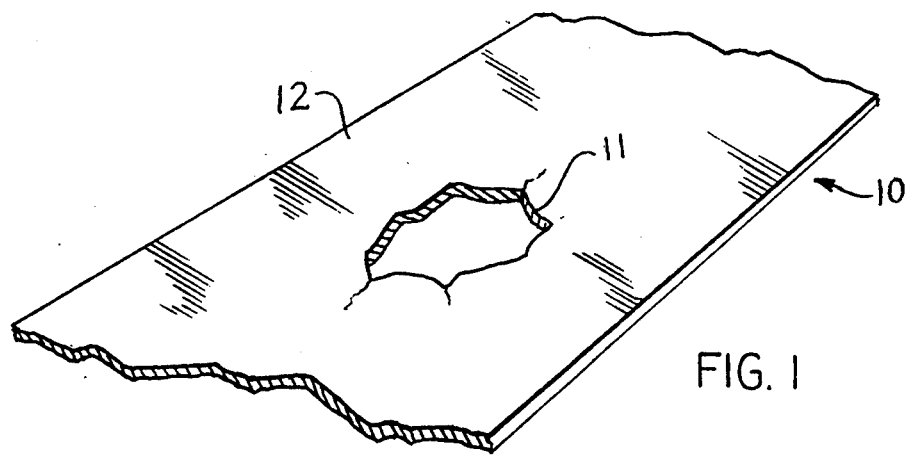
FIG. 1 shows a non-stressed aircraft structure with damage thereon.

Turning now to FIG. 1 there is shown a non-stressed aircraft structure generally shown at 10 having a damaged area 11. The structure can either be metallic or non-metallic, however, in the preferred embodiment the structure is non-metallic material. The non-metallic structure 12 as shown in FIG. 1 must be a structure capable of receiving a high impact without damage and must be able to meet the Federal Aviation Regulation (FAR) 14 CFR Part 25, Amendment No. 25-60, Paragraph 25.855 (a-1)(1) and Part III of Appendix F, Oil Burner Test Requirement. An example of non-stressed, non-metallic structure in transport aircraft that must meet the burn test requirement given above, is the cargo bay of these aircraft. If a fire starts in the cargo bay, it must be contained in that bay and not travel to other parts of the aircraft which would result in obvious disastrous results. Most cargo bays of transport aircraft are made of fiberglass and have a covering of Tedlar ® which provides an appealing appearance and texture. Tedlar ® is a trade name of E. I. DuPont de Nemours and Company, Inc., Wilmington, Del., for a polyvinylfluoride type of fluorocarbon film. Some of the older transport aircraft, however, do not have a Tedlar ® covering over the non-metallic structure.

Figure 2:
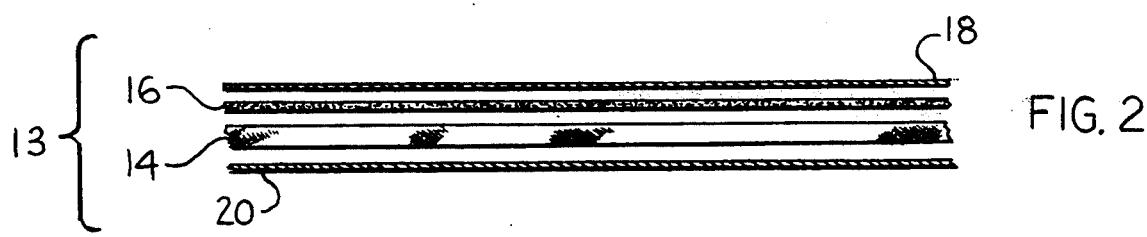
FIG. 2 shows the layered construction of a patch used in the present invention.

FIG. 2 shows that composition of the layers of material 13 that is used for patching the damaged structure. The basic material is cured glass cloth 14 that is composed of plies of woven glass, impregnated with a thermosetting resin and cured with the application of heat and pressure. In the preferred embodiment, the thermosetting resin is a phenolic resin, however, a polyester or a epoxy resin may be used with equally successful results. A cured laminate made from woven glass cloth impregnated with a phenolic resin and having a Tedlar ® overlay may be purchased from M. C. Gill of El Monte, Calif. under the trade name of Gilfab 1167, which is incorporated herein by reference. FIG. 2 also shows the Tedlar overlay 20 which is bonded to the glass cloth 14 when the laminate is used to fabricate patch 22. The cured laminate having a Tedlar ® overlay bonded thereto is at least 0.010 inches thick in the preferred embodiment wherein the Tedlar ® overlay prior to being bonded to the laminate is at least 1 mil thick. The cured laminate with the Tedlar ® bonded thereto as described above is also fire resistant and meets the Federal Aviation Requirements (FAR 25.855) which is the same as that described for the structure 12. FIG. 2 also shows a pressure sensitive adhesive film 16 having a release liner 18. (For illustration purposes, the release liner 18 has been removed from the pressure sensitive adhesive film 16.) The release liner 18 is a thin film of plastic that is placed on the pressure sensitive adhesive film 16 to preserve the adhesive capability, however in some embodiments paper may be used. The pressure sensitive film side without the release liner is pressure bonded to the cured glass cloth side without the Tedlar ® overlay. The release liner 18 will be removed just prior to placing the patching material 13 over the damaged area 11. The pressure sensitive adhesive film 16 in the preferred embodiment is fire retardant and non-hardening and is an acrylic base film although a rubber base film can be used with equally successful results. The preferred embodiment pressure sensitive adhesive film 16 can be purchased from E & H Laminating and Slitting Company, Paterson, N.J. designated as E&H 775-3FR3 non-supported, standard bonding film and is incorporated herein by reference. The preferred embodiment pressure sensitive adhesive film 16 is at least 1.0 mils thick.

Figure 3:
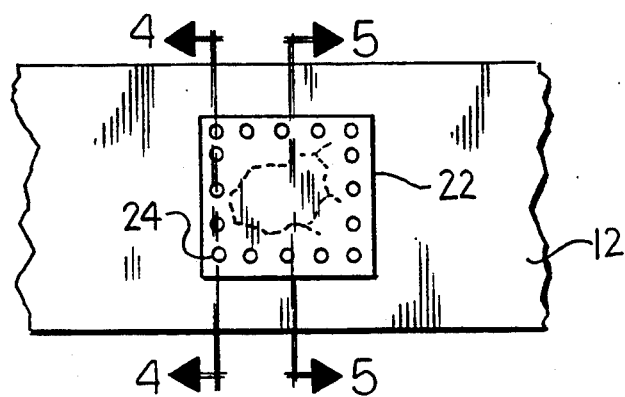
FIG. 3 shows a patch fastened over the damaged area of the non-stressed aircraft structure.

Turning now to FIG. 3 there is shown a shaped patch 22 fastened to a damaged structure 12 by mechanical fasteners 24 that are capable of withstanding a temperature of at least 1,700 degrees fahrenheit. The patch 22 shown in FIG. 3 has had the release liner 18 removed from the pressure sensitive film 16 and the patch 22 is carefully placed over the damaged area 11 on structure 12. Pressure is applied to patch 22 until an air tight seal is obtained between structure 12 and patch 22. The overlap of patch 22, or the distance from the edge of the damaged area 11 to the edge of patch 22 is at least 1 inch. Mechanical fasteners 24 are placed through drilled holes of appropriate diameter wherein the distance the mechanical fasteners 24 are placed from the edge of patch 22 may vary from ⅜ inch to 2 inches. This spacing will be determined by the size of the patch and the severity of the damaged section 11. The spacing between the mechanical fasteners 24 is at least 0.75 inches. In the preferred embodiment the mechanical fasteners 24 are of the blind type which have a low clamp up force and therefore provides a low preload force. The blind mechanical fasteners 24 having a self-restraining pin also have a large bearing area for the manufactured head and blind side upset. In the preferred embodiment, the blind mechanical fastener 24 is a blind fastener made of monel metal which is capable of withstanding a temperature of at least 1,700 degrees fahrenheit. A monel metal blind mechanical fastener that can be used in the present invention may be purchased from Cherry Aerospace, Torrance, Calif. as Part No. CR8M83 which is incorporated herein by reference.

Figure 4:
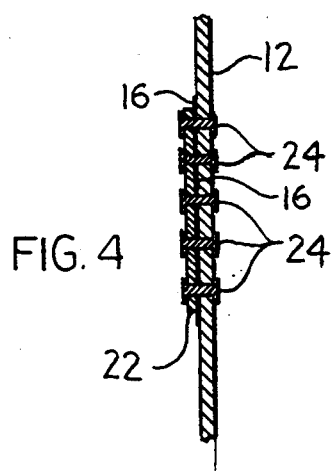
FIG. 4 is a cross section of the edge of the patch attached to the damaged structure showing the rivet pattern.

Turning now to FIG. 4 there is seen a cross section of a patch 22 attached to structure 12 with the pressure sensitive adhesive film 16 therebetween. The hole and fastener spacing in between blind mechanical fasteners 24 in FIG. 4 is at least 0.75 inches.

Figure 5:
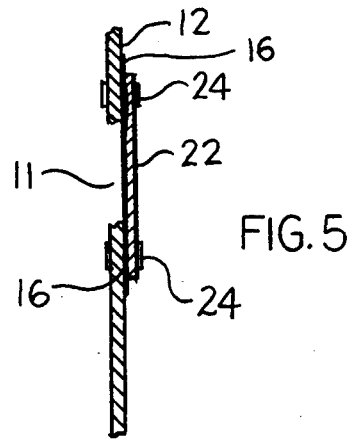
FIG. 5 is a cross section of the patch attached to the damaged structure showing the patch covering the damaged area.

FIG. 5 shows a cross section of a patch 22 across the damage portion 11 of structure 12. The blind mechanical fasteners in FIGS. 4 and 5 are shown in upset condition. The heads and upset portion of the blind mechanical fasteners 24 are shown with a large bearing area which is required in the present invention for non-metallic structure 12 and patch 22. Also shown in FIG. 5 is the pressure sensitive adhesive film which provides an air tight seal between the structure 12 and the patch 22 when pressure is applied to patch 22.

The application of patch 22 is simple and easy for a non-skilled worker to apply. The area of the structure 12 surrounding the damaged area 11 is thoroughly cleaned with a non-flamable degreasing solvent. The area of structure 12 around the damaged area 11 is then wiped clean and dry with a lint free cloth. The patch 22 including the pressure sensitive film 16 attached to patch 22 and with the release liner 18 removed is then carefully placed over the damaged area 11 of structure 12 and pressure applied to the patch 22 until an air tight seal is obtained between the patch 22 and structure 12. Appropriate diameter holes are drilled with a drill bit (not shown) that shall not exceed 0.25 inches measured from the drill chuck end to the end of the drill bit. The diameter of the blind mechanical fasteners shall be at least ⅛ inch in diameter. Once the holes (not shown) with the proper spacing and with the proper distance from the patch edge are completed, the appropriate blind fasteners 24 are inserted in the holes and a blind mechanical fastener hand tool (not shown) is used to upset the blind mechanical fasteners 24 to provide a firm, air tight seal between the patch 22 and the structure 12.

Thus, it is apparent that there has been provided in accordance with this invention an apparatus and method for effecting repair to damaged, non-stressed transport aircraft structure that fully satisfied the objectives, aims, and advantages set forth above. While the invention has been described in conjunction with specific embodiments thereof, it is evident that many alternatives, modifications, and variations will be apparent to those skilled in the art in light of the aforegoing description. Accordingly, it is intended to embrace all such alternatives, modifications, and variations that fall within the spirit and scope of the appended claims.

What is claimed is:

1. A fire-resistant repair patch for a damaged, non-stressed structure of a transport aircraft comprising:
    a shaped, non-metallic fire resistant patch of sufficient size to cover a damaged area of the structure, said non-metallic patch comprising a cured resin impregnated glass cloth material having high impact resistance and remaining intact after exposure to temperatures of approximately 1700 degrees Farenheit at a heat flux of approximately 8.0 BTU per sq. ft. sec. as provided in Federal Aviation Regulation (FAR) 14 CFR Part 25, Amendment No. 25-60, Paragraph 25.855 (a-1) (1) and Part III of Appendix F, oil burner test requirement;
    a fire-retardant pressure sensitive, permanently tacky adhesive film pressure bonded to said shaped fire resistant patch for bonding said adhesive film bonded to said patch to the damaged area, said film having a release liner on one side;
    a plurality of blind mechanical fasteners placed around the edge of the patch for attaching said fire resistant, non-metallic patch combined with said pressure sensitive film to the damaged area of the structure, said fasteners can withstand a temperature of at least 1700° F.

2. A repair patch as described in claim 1 wherein said non-metallic patch is composed of plies of woven glass cloth impregnated with a thermosetting resin, said glass cloth being thoroughly cured with the application of heat and pressure.

3. A repair patch as described in claim 1 wherein said damaged structure is a non-metallic material.

4. A repair patch as described in claim 3 wherein said non-metallic material is covered with polyvinylfluoride material.

5. A repair patch as described in claim 2 wherein said woven glass cloth is impregnated with a phenolic thermosetting resin.

6. A repair patch as described in claim 2 wherein said woven glass is impregnated with a polyester thermosetting resin.

7. A repair patch as described in claim 2 wherein said woven glass is impregnated with an epoxy thermosetting resin.

8. A repair patch as described in claim 2 wherein said non-metallic patch has a polyvinylfluoride material overlay attached to one surface.

9. A repair patch as described in claim 8 wherein said non-metallic patch thickness is at least 0.010 inches and the polyvinylfluoride material overlay attached to said non-metallic patch is at least 1 mil thick.

10. A repair patch as described in claim 1 wherein said pressure sensitive adhesive film is an acrylic based film.

11. A repair patch as described in claim 1 wherein said pressure sensitive adhesive film is a rubber based film.

12. A repair patch as described in claim 1 wherein said pressure sensitive adhesive film is at least 1.0 mil thick.

13. A repair patch as described in claim 8 wherein said pressure sensitive adhesive film side having no release liner attached thereto is joined to the side of said repair patch having no polyvinylfluoride material overlay attached thereto by pressure means.

14. A repair patch as described in claim 13 wherein said non-metallic repair patch shall be placed on said damaged non-stressed structure and overlap said damaged area of said non-stressed structure at least 1 inch, said non-metallic repair patch being pressed on said non-stressed structure to form an air tight bond.

15. A repair patch as described in claim 1 wherein said mechanical fasteners attach said patch to area surrounding said damaged non-stressed structure.

16. A repair patch as described in claim 15 wherein said blind fasteners have a low clamp up force which provides a low preload force and a manufactured head bearing area and blind side upset bearing area which are both large relative to damaged area holes which receive said fasteners.

17. A repair patch as described in claim 16 wherein the spacing between said mechanical fasteners is at least 0.75 inches.

18. A repair patch as described in claim 16 wherein the distance mechanical fasteners are placed from the edge of said patch is within the approximate range of ⅛ inch to 2 inches.

19. A repair patch as described in claim 16 wherein said blind mechanical fasteners are made from monel metal.

* * * * *